United States Patent
Shami et al.

(10) Patent No.: US 9,569,413 B2
(45) Date of Patent: Feb. 14, 2017

(54) DOCUMENT TEXT PROCESSING USING EDGE DETECTION

(75) Inventors: Mohammad Shami, Sunnyvale, CA (US); David Herman, Easton, PA (US); Sherif Botros, Redwood City, CA (US)

(73) Assignee: SAP SE, Walldorf (DE)

( * ) Notice: Subject to any disclaimer, the term of this patent is extended or adjusted under 35 U.S.C. 154(b) by 448 days.

(21) Appl. No.: 13/465,833

(22) Filed: May 7, 2012

(65) Prior Publication Data

US 2013/0297999 A1 Nov. 7, 2013

(51) Int. Cl.
*G06F 17/30* (2006.01)
*G06F 17/22* (2006.01)

(52) U.S. Cl.
CPC ..... *G06F 17/2241* (2013.01); *G06F 17/30719* (2013.01)

(58) Field of Classification Search
CPC .................. G06F 17/30867; G06F 17/30011; G06F 17/2705; G06F 17/2775; G06F 17/3053; G06F 17/30707; G06F 17/2765; G06F 17/30253; G06F 17/30705; G06F 17/30014; G06F 17/30719; G06F 17/21; G06N 99/005; G06N 3/0454; G06N 3/02
USPC .............................. 715/205, 234; 706/20, 55
See application file for complete search history.

(56) References Cited

U.S. PATENT DOCUMENTS

| | | |
|---|---|---|
| 6,438,543 B1 * | 8/2002 | Kazi et al. |
| 6,961,728 B2 | 11/2005 | Wynblatt et al. |
| 6,963,830 B1 * | 11/2005 | Nakao ............... G06F 17/30719 704/1 |
| 7,073,122 B1 * | 7/2006 | Sedghi .......................... 715/234 |
| 7,937,281 B2 | 5/2011 | Miller et al. |
| 7,953,219 B2 | 5/2011 | Freedman et al. |
| 8,161,073 B2 | 4/2012 | Connor |

(Continued)

FOREIGN PATENT DOCUMENTS

WO   WO-2011/139687 A1   11/2011

OTHER PUBLICATIONS

Clark, et al., "Conference resolution: current trends and future directions." Nov. 24, 2008. Retrieved from the Internet: <http://www.cs.cmu.edu/~jhclark/pubs/clark_gonzalez_conference.pdf>, on Oct. 20, 2010.

(Continued)

*Primary Examiner* — Stephen Hong
*Assistant Examiner* — Ahamed I Nazar
(74) *Attorney, Agent, or Firm* — Mintz Levin Cohn Ferris Glovsky and Popeo, P.C.

(57) ABSTRACT

A document is received that has a plurality of lines with text. This document includes text associated with at least one topic of interest and text not associated with the at least one topic of interest. Thereafter, it is determined, for each line in the document, a length of the line and a number of off-topic indicators with the off-topic indicators characterizing portions of the document as likely being not being associated with the at least one topic of interest. Thereafter, a density for each line can be determined based on the determined line length and the determined number of off-topic indicators. The determined densities for each line are used to identify portions of the documents likely associated with the at least one topic of interest so that data characterizing the identified portions of the document can be provided. Related apparatus, systems, techniques and articles are also described.

19 Claims, 5 Drawing Sheets

(56) References Cited

U.S. PATENT DOCUMENTS

| | | | |
|---|---|---|---|
| 8,326,764 B1 | 12/2012 | Morse et al. | |
| 8,504,397 B2 | 8/2013 | Vempati et al. | |
| 8,631,473 B2 | 1/2014 | Bhatia et al. | |
| 8,812,508 B2* | 8/2014 | Zhang et al. | 707/741 |
| 2002/0123919 A1 | 9/2002 | Brockman et al. | |
| 2002/0184267 A1* | 12/2002 | Nakao | G06F 17/30719 715/255 |
| 2004/0024662 A1 | 2/2004 | Gray et al. | |
| 2004/0049473 A1* | 3/2004 | Gower et al. | 706/46 |
| 2005/0066269 A1* | 3/2005 | Wang et al. | 715/513 |
| 2005/0108630 A1* | 5/2005 | Wasson et al. | 715/513 |
| 2005/0278613 A1* | 12/2005 | Morinaga | G06F 17/30719 715/256 |
| 2006/0036596 A1* | 2/2006 | Zhang | G06F 17/30719 |
| 2006/0112110 A1 | 5/2006 | Maymir-Ducharme et al. | |
| 2007/0005586 A1 | 1/2007 | Shaefer et al. | |
| 2007/0010993 A1* | 1/2007 | Bachenko | G06F 17/274 704/9 |
| 2007/0118506 A1* | 5/2007 | Kao | G06F 17/30719 |
| 2007/0265996 A1* | 11/2007 | Odom et al. | 707/1 |
| 2008/0114800 A1* | 5/2008 | Gazen et al. | 707/101 |
| 2008/0256051 A1* | 10/2008 | Liu | G06F 17/30864 |
| 2009/0182553 A1* | 7/2009 | Chaney | G06F 17/3061 704/9 |
| 2009/0198654 A1 | 8/2009 | Surendran et al. | 707/3 |
| 2009/0222360 A1 | 9/2009 | Schmitt et al. | |
| 2010/0076972 A1 | 3/2010 | Baron et al. | |
| 2010/0100370 A1 | 4/2010 | Khouri et al. | |
| 2010/0262454 A1* | 10/2010 | Sommer | G06Q 30/02 706/20 |
| 2011/0221565 A1 | 9/2011 | Ludlow et al. | |
| 2012/0042232 A1* | 2/2012 | Brelsford | G06F 17/30014 715/206 |
| 2012/0072358 A1 | 3/2012 | Famous et al. | |
| 2012/0096029 A1 | 4/2012 | Tamura et al. | |
| 2012/0102031 A1 | 4/2012 | Shami et al. | |
| 2012/0150973 A1 | 6/2012 | Barak | |
| 2012/0254333 A1* | 10/2012 | Chandramouli | G06F 17/27 709/206 |
| 2012/0254726 A1* | 10/2012 | Sandhaus | G06F 17/30911 715/234 |
| 2013/0031088 A1* | 1/2013 | Srikrishna et al. | 707/722 |
| 2013/0091143 A1 | 4/2013 | Raemy et al. | |
| 2013/0138428 A1* | 5/2013 | Chandramouli | G06F 17/274 704/9 |
| 2013/0204658 A1 | 8/2013 | Yogev et al. | |

OTHER PUBLICATIONS

Cucerzan, "Large-scale named entity disambiguation based on Wikipedia data", Proc. 2007 Joint Conf. on Empirical Methods in Nat. Lang. Proc. & Comp. Nat Lang. Learning (pp. 708-716, Jun. 2007.

European Search Report dated Feb. 16, 2012, for corresponding European Patent Application No. 11007491.1.

Jain, et al., "Data Clustering: A Review", ACM Computing Surveys, vol. 31, No. 3, Sep. 1999.

Magdy et al., "Arabic Cross-Document Person Name Normalization", Proceedings of the 5th Workshop on Important Unresolved Matters, pp. 25-32, Jun. 2007.

Ravin, et al., "Extracting Names from Natural-Language Text", IBM Research Division, Retrieved from the Internet: <URL:http://www.reserach.ibm.com/talent/documents/20338.pdf>, retrieved on Apr. 11, 2006.

\* cited by examiner

FIG. 2

DOCUMENT TEXT PROCESSING USING EDGE DETECTION

TECHNICAL FIELD

The subject matter described herein relates to the use of edge detection techniques to identify portions of documents pertaining to a main topic (or topics) of interest and to filter portions of documents that likely do not pertain to the main topic (or topics) of interest.

BACKGROUND

Electronic documents, and in particular mark-up documents such as web pages, HTML documents, XML documents, etc., often have various text items which are not-directed to a main topic of the document (i.e., they are "off-topic", etc.). Such text items can include navigational text such as menus, advertisements, notices, disclaimers, messaging/status feeds, markups, HTML code and more. When performing a text analysis on such documents relating to the main topic, these text items need to be stripped or otherwise filtered as they contain unnecessary information that negatively impacts the analysis and can require further processing resources if they are analyzed. Additionally, when making such documents available for review by a user the unnecessary information should be suppressed.

SUMMARY

In one aspect, a document is received that has a plurality of lines with text. This document includes text associated with at least one topic of interest and text not associated with the at least one topic of interest. Thereafter, it is determined, for each line in the document, a length of the line and a number of off-topic indicators with the off-topic indicators characterizing portions of the document as likely being not being associated with the at least one topic of interest. Thereafter, a density for each line can be determined based on the determined line length and the determined number of off-topic indicators. The determined densities for each line are used to identify portions of the documents likely associated with the at least one topic of interest so that data characterizing the identified portions of the document can be provided (e.g., stored, displayed and/or transmitted to a remote computing system, generating a cleaned document file, etc.).

The determined number of off-topic indicators can be based on a number of characteristics/attributes including, for example, a number of hyperlinks in the line, a number of formatting portions, spaces, font tags, font information, HTML Tags, spacing, non-printed text formatting and spacing elements, or characters found within the line. The number of off-topic indicators for each line can be proportional to a weighted sum of the number of hyperlinks and a number of two consecutive space characters.

The density for each line can be proportional to the length of the line and inversely proportional to a super linear factor in the number of off-topic indicators. In some implementations, a density smooth filter can be applied to each line to result in smoothed densities. In such cases, the portions of the documents likely associated with the at least one topic of interest can be identified using the smoothed densities.

The portions of the documents likely associated with the at least one topic of interest can be identified by: for every line in file, if a pre-defined density related condition is met, (i) growing an existing text island if an immediately prior line is part of the existing text island, or (ii) creating a new text island if the immediately prior line is not part of an existing text island, and if a pre-defined density condition is not met, skipping the line. The pre-defined density relation condition can comprise whether the density for the line is above a pre-defined value, be experimentally determined using a plurality of historical documents, and/or be determined using a model trained using a plurality of historical documents. If a model is utilized, it can be, for example, a supervised machine learning algorithm or a regression model.

After the text islands have all been generated, for every island, each text island that does not meet a pre-defined retention condition can be dropped and each remaining text island can be written to a cleaned document file. The remaining text islands at this point correspond to the identified portions of the documents likely associated with the at least one topic of interest. The pre-defined retention condition can include a minimum number of lines for each text island and/or a spatial location of the text island in comparison to other text islands.

Articles of manufacture are also described that comprise computer executable instructions permanently stored on non-transitory computer readable media, which, when executed by a computer, causes the computer to perform operations herein. Similarly, computer systems are also described that may include a processor and memory coupled to the processor. The memory may temporarily or permanently store one or more programs that cause the processor to perform one or more of the operations described herein. In addition, methods can be implemented by one or more data processors either within a single computing system or distributed among two or more computing systems.

The subject matter described herein provides many advantages. By filtering or otherwise disregarding off-topic text items from documents, any resulting text analysis is more accurate and can be more rapidly performed while using less processing resources.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 2 is a sample web page having text associated with the at least one topic of interest and text not associated with the at least one topic of interest;

DETAILED DESCRIPTION

As will be described in further detail below, the current subject matter relates to text analysis as it supports augmenting unstructured data records with information the user of a system may find helpful. Technically, the problem relates to identifying the text segments within a document, such as an HTML document that pertain to a main topic of the document. The goal of the current subject matter is to strip away all mark-up that contains text that is off topic text. The solution provided herein uses edge detection which traditionally aims to identifying parts of an image that have discontinuities—e.g. change in brightness or color or segments voice signal into homogenous pieces as in the case of speaker or topic detection. Edge detection techniques as used herein can locate the text portions of a document amongst lines that are both text and mark-up. By looking at the lines of the document a measure is computed which is proportional to the amount of text and inversely proportional to the amount of mark-up—e.g. links and figures. By looking for edges irrelevant segments of the document can be identified and removed.

Figure 1:
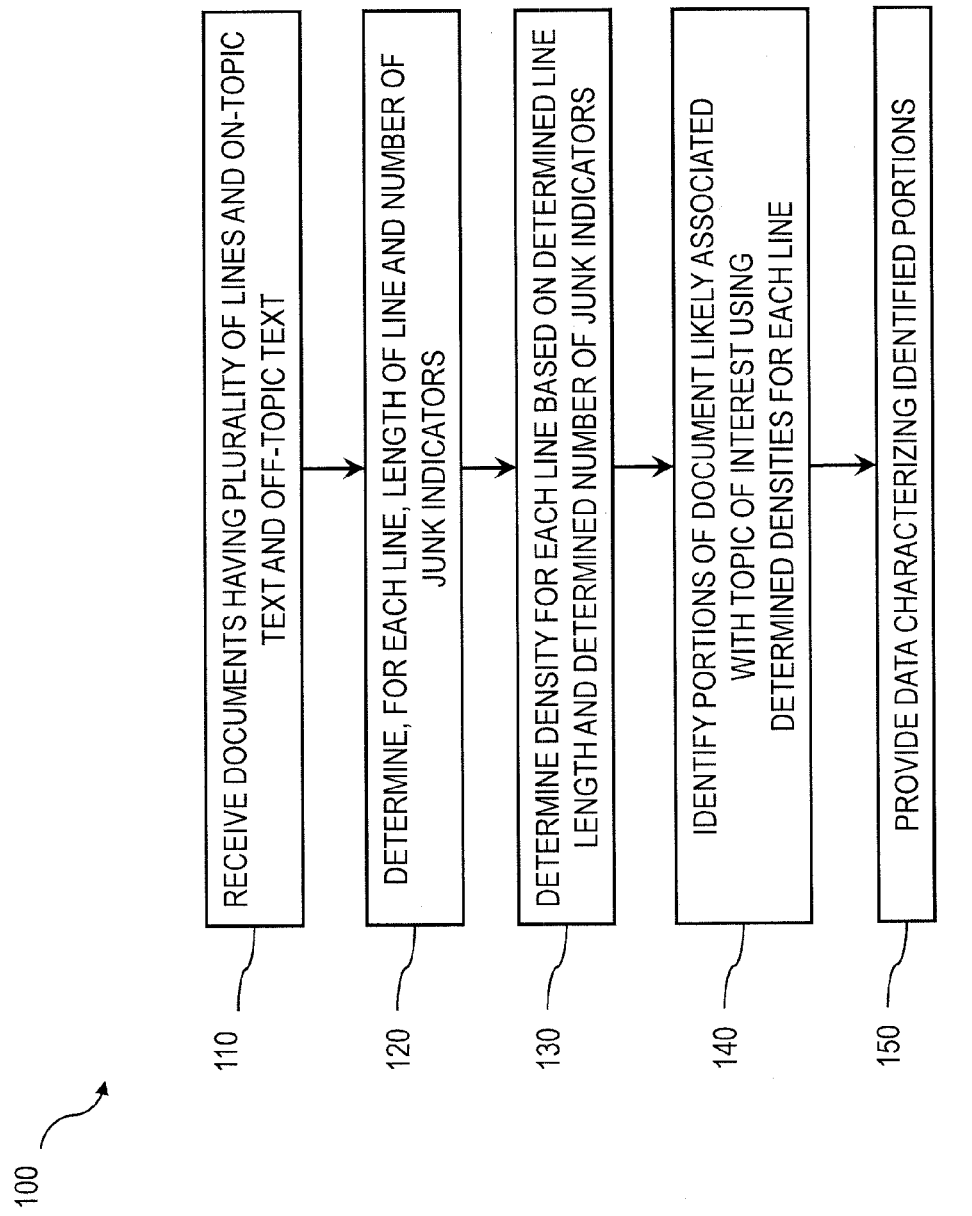
FIG. 1 is a process flow diagram illustrating identification of portions of a document pertaining to at least one topic of interest.

FIG. 1 is a process flow diagram illustrating a method 100, in which, at 110, a document is received having a plurality of lines with text. The document includes text associated with at least one topic of interest as well as text not associated with the at least one topic of interest. Thereafter, at 120, a length of the line and a number of off-topic indicators is determined for each line in the document. The off-topic indicators characterize portions of the document that are not likely associated with at least one topic of interest. In addition, at 130, a density for each line is determined based on the determined line length and the determined number of off-topic indicators. Portions of the document likely associated with the at least one topic of interest are identified, at 140, using the determined densities for each line. Data is then, at 150, provided that characterizes the identified portions of the document.

Figure 2:
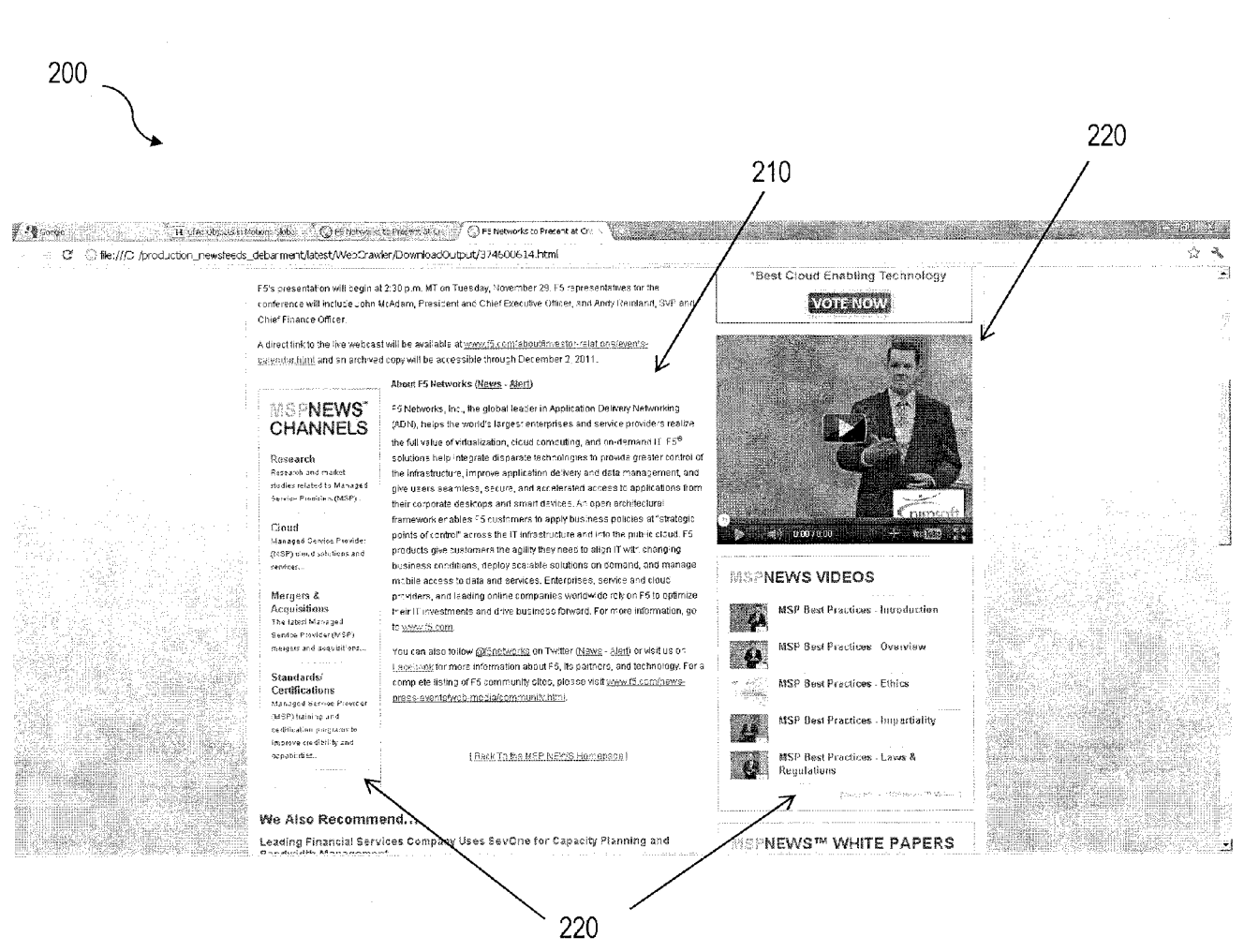
Figure 3:
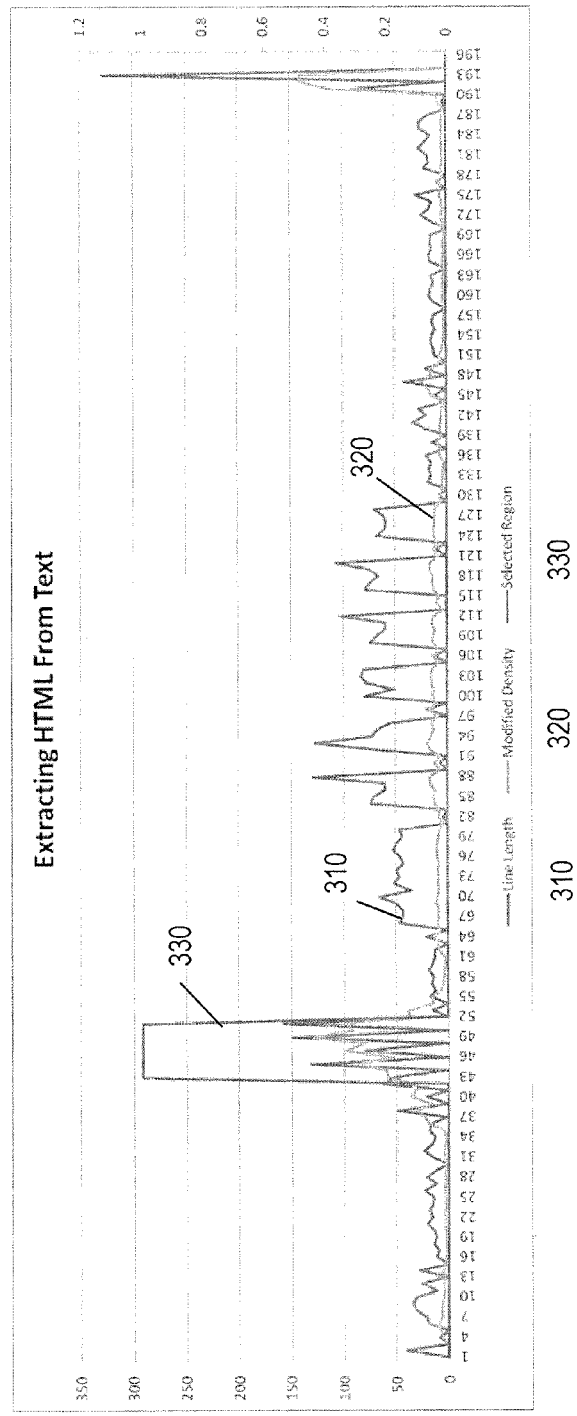
FIG. 3 is a diagram illustrating measures of line length and calculated density for each line of an analyzed document.

FIG. 2 is a sample web page 200 and FIG. 3 is a diagram 300 illustrating a textual analysis of the web page 200. The document corresponding to the web page 200 contains not only the displayed text but underlying formatting elements, spaces, font tags, font information, HTML Tags, spacing, non-printed text, or the like, used to render the web page 200. As can be appreciated, the web page contains a section 210 pertaining to a main topic of interest and other sections 220 that do not pertain to a main topic of interest (such as videos for unrelated topics, news articles, advertisements, etc.).

The modified density can be used to determine the likelihood a line is on topic. Density is proportional to length of line e.g. number of characters or words. Modified density is proportional to density and inversely proportional to super linear factor (eg quadratic and or exponential) in off topic indicators. With reference to the diagram 300, the x-axis represents particular lines of document (e.g. a line of code, etc.). Two measures are illustrated—a first relating to line length 310 (i.e., the number of characters in a particular line of the document, etc.) and, a second relating to a modified density 320 which reflects the number of characters in each line of the document after adjustments. As will be stated below, a function can be utilized to generate the modified density 320 from the raw line lengths 310. The lines having the highest remaining characters in the modified density 320 can be determined using an algorithm utilizing edge detection methodologies to make for a selected region 330. The diagram 300 indicates that the main topic information content is largely at lines 38 through 51. The other lines are indicated as being less useful. The logic below can then be performed so that line lengths can be computed. The density can then be calculated, and in some cases, smoothed. The modified density can be used to determine the likelihood a line is on topic. The segment of the line, referred to as a text island, contains the main topic is identified and the remaining islands are optionally discarded.

Figure 4:
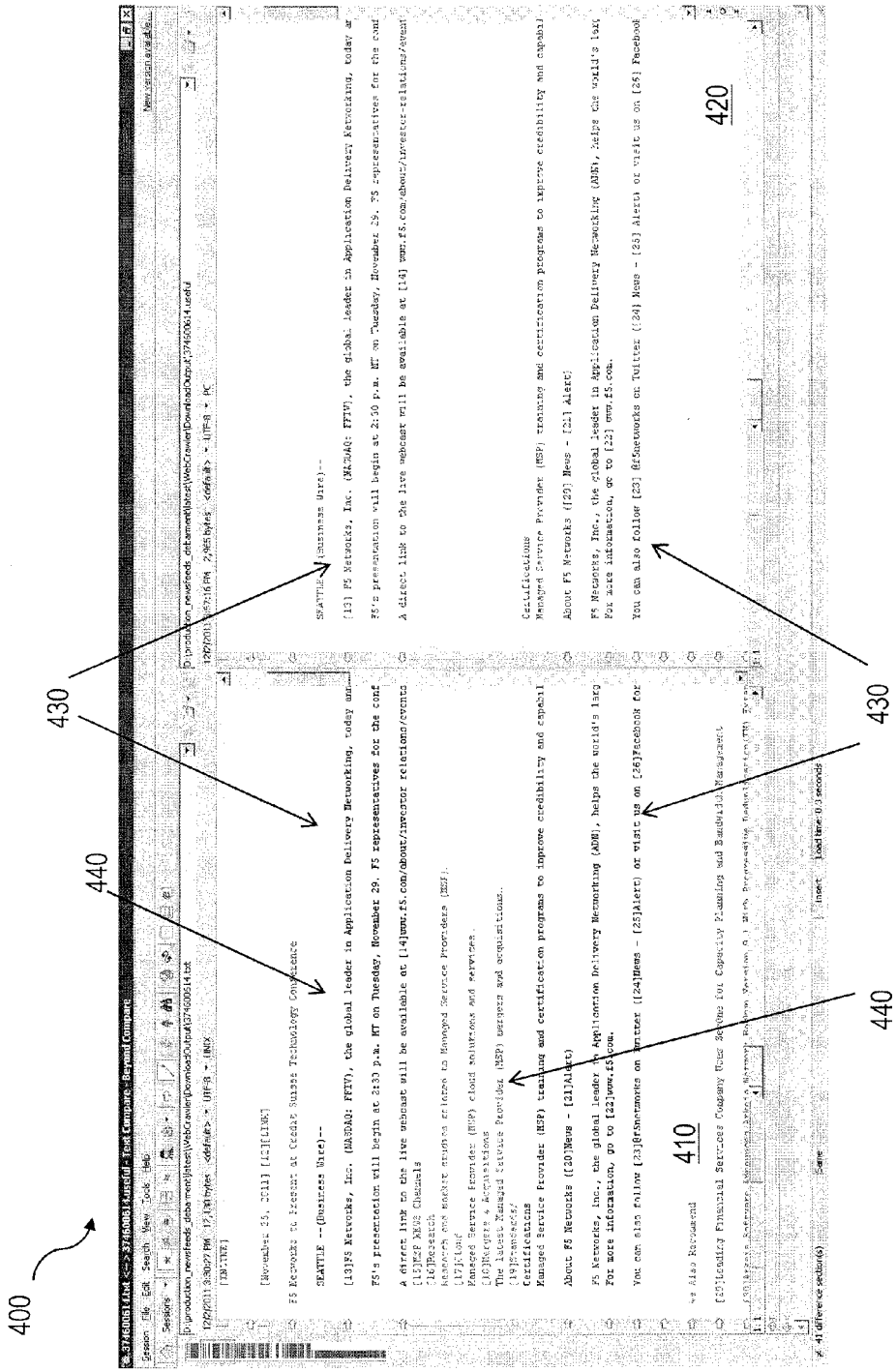
FIG. 4 is a screenshot of an interface illustrating lines of text in an analyzed document and a resulting cleaned file.

Pseudo Code
open file
open cleanedFile
for every line in file
   countOffTopicIndicators=number of Hyperlinks in line×1+number of two consecutive space characters×0.05;
   lineLength=total length of line;
   density=lineLength/(2^(2×countOffTopicIndicators));
for every line in file
   apply density smoothing filter
for every line in file
   if certain density related condition is met (i.e. smoothed density over a threshold)
     create new text island
   else
     grow an existing island
for every island
   drop island under certain conditions (e.g if island is too far from the center of all other islands)
for every remaining island
   write to cleanedFile FIG. 4 is a diagram 400 illustrating a comparison between the document 410 and the cleaned file 420. Certain highlighted portions of the text 440 in the document 410 are identified as being not likely associated with at least one topic of interest (using the techniques described herein). The other portions of the document 410 comprise text islands 430 which are saved to the cleaned file 420.

Figure 5:
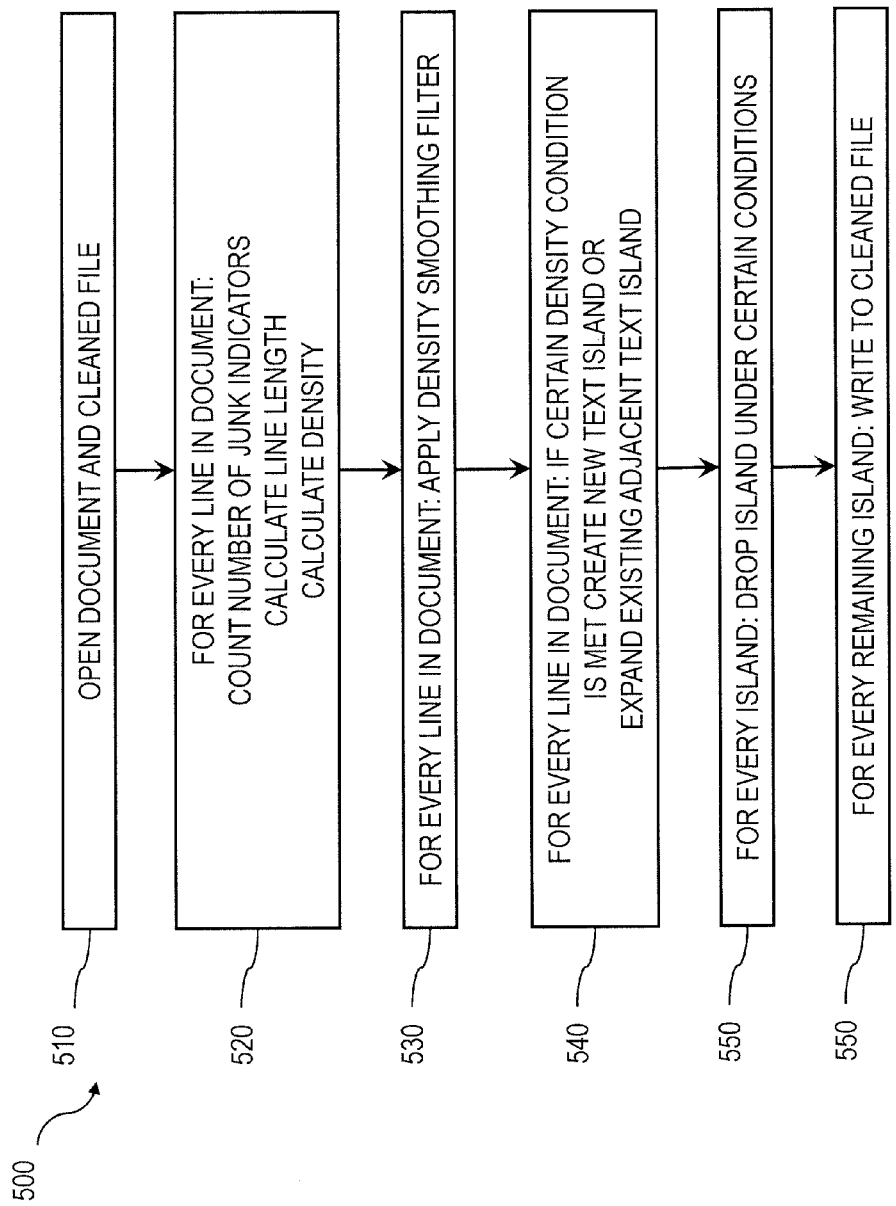
FIG. 5 is a process flow diagram illustrating the generation of a cleaned file from a document having at least one topic of interest.

FIG. 5 is a process flow diagram illustrating a method 500 for implementing an algorithm (such as, that in the above-pseudo code). A document to be analyzed is opened, at 110, as well as a cleaned file. For every line in the document, at 120, a number of off-topic indicators are counted as well as a line length and a density. The number of off-topic indicators can be based on text that is unlikely to be associated with a main topic of interest. In one implementation, the number can be a count. Example off-topic indicators include hyperlinks, multiple consecutive space characters, formatting elements, font tags, font information, HTML Tags, non-printed text other anchors from the WWW consortium. In some implementations, the number of off-topic indicators can be proportional to a weighted sum of measures of off-topic indicators. In one example, the number of off-topic indicators for each line is equal to the number of hyperlinks in the line×1 (or other weighting factor)+the number of two consecutive space characters×0.05 (or other weighting factor). Space characters include ASCII code 20 and similar codes that typically indicate the end of a sentence or phrase. The line length can be based on the number of characters in each line of the document. In one implementation, the modified density for each line can be proportional to the density and inversely proportional to the off-topic indicators. In another implementation, the modified density can be inversely proportional an exponential of the number the off-topic indicators. For example, an exponent base of 2, e, or 10. The density for each line can equal, for example, line length/$2^{(2*number\ of\ offTopic\ indicators)}$. In some cases, at 130, a density smoothing filter can be applied to each line. For example, a local mean of the density measure for five adjacent line measurements can be made (e.g., five points −2, −1, 0, +1, +2). In some implementations, Laplacian smoothing, locally weighted scatterplot smoothing, edge preserving smoothing, and the like can be used.

In some implementations, smoothing can also be achieved by applying operations that grow islands or shrink islands. In such and related variations, the islands can be first contracted to create seed islands for region growing and to remove outlier islands consisting of one or two lines. Then each surviving seed island can be grown by selectively adding lines to the edges of the seed islands. Island growing would then fill any existing narrow holes residing between two islands. The final result would be fewer and flatter islands.

Thereafter, at 140, for every line in the document, if certain density relation conditions are met (e.g., whether the smoothed density value is over a pre-defined threshold, etc.) and there is not an adjacent text island, a new text island is created. Otherwise, if the density related condition is met, an existing text island can be grown (i.e., the particular line can be added to an existing island that includes the immediate prior text line in the first document). Once the text islands have initially been generated, at 150, some of the text islands can be eliminated. For example, a text island can be dropped if it is too far from the center of all of the other islands. Any remaining islands are then at 150, saved/written to the cleaned file.

An optimal pre-defined density related condition can be either experimentally determined and applied to all documents or automatically adjusted on a document by document. Another way to calculate the pre-defined density condition can be by hand labeling a set of documents and building a model such as a supervised machine learning algorithm or regression model in order to arrive at the optimal value for the density condition.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein, or another computing device), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and with a distinct operating environment and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. A method comprising:
   receiving a document having a plurality of lines with text, the document comprising text associated with at least one topic of interest and text not associated with the at least one topic of interest;
   determining, for each line in the document, a length of the line and a number of off-topic indicators, the off-topic indicators characterizing portions of the document as likely being not being associated with the at least one topic of interest;
   determining a density for each line based on the determined line length and the determined number of off-topic indicators, the density for each line being proportional to the determined line length and inversely proportional to an exponential base greater than one of the number of off-topic indicators;
   identifying, using the determined densities for each line, portions of the document likely associated with the at least one topic of interest; and
   providing data characterizing the identified portions of the document.

2. A method as in claim 1, wherein, the determined number of off-topic indicators is based on a number of hyperlinks in the line.

3. A method as in claim 1, wherein, the determined number of off-topic indicators is based on one or more of: a number of formatting portions, spaces, font tags, font information, HTML Tags, spacing, non-printed text formatting and spacing elements, or characters found within the line.

4. A method as in claim 2, wherein the number of off-topic indicators for each line is proportional to a weighted sum of the number of hyperlinks and a number of two consecutive space characters.

5. A method as in claim 1, further comprising: applying a density smoothing filter to each line to result in smoothed densities, and wherein the portions of the documents likely associated with the at least one topic of interest are identified using the smoothed densities.

6. A method as in claim 1, wherein the portions of the documents likely associated with the at least one topic of interest are identified by: for every line in file, if a pre-defined density related condition is met, (i) growing an existing text island if an immediately prior line is part of the existing text island, and (ii) creating a new text island if the immediately prior line is not part of an existing text island, and if a pre-defined density condition is not met, skipping the line.

7. A method as in claim 6, wherein the pre-defined density relation condition comprises whether the density for the line is above a pre-defined value.

8. A method as in claim 6, wherein the pre-defined density condition is experimentally determined using a plurality of historical documents.

9. A method as in claim 6, wherein the pre-defined density condition is determined using a model trained using a plurality of historical documents.

10. A method as in claim 9, wherein the model comprises: a supervised machine learning algorithm or a regression model.

11. A method as in claim 7, wherein after the text islands have all been generated, for every island, dropping each text island that does not meet a pre-defined retention condition, and writing each remaining text island to a cleaned document file, the remaining text islands corresponding to the identified portions of the documents likely associated with the at least one topic of interest.

12. A method as in claim 11, wherein the pre-defined retention condition comprises a minimum number of lines for each text island.

13. A method as in claim 11, wherein the pre-defined retention condition comprises a spatial location of the text island in comparison to other text islands.

14. A method as in claim 1, wherein providing data comprises one or more of storing the data, transmitting the data, and displaying the data.

15. A method as in claim 1, wherein providing data comprises generating a cleaned document file removing the portions of the document not likely associated with the at least one topic of interest.

16. A non-transitory computer-readable medium encoding instructions that, when executed by at least one data processor, cause the at least one data processor to perform operations comprising:
  receiving a document having a plurality of lines with text, the document comprising text associated with at least one topic of interest and text not associated with the at least one topic of interest;
  determining, for each line in the document, a length of the line and a number of off-topic indicators, the off-topic indicators characterizing portions of the document as likely being not being associated with the at least one topic of interest;
  determining a density for each line based on the determined line length and the determined number of off-topic indicators, the density for each line being proportional to the determined line length and inversely proportional to an exponential base greater than one of the number of off-topic indicators;
  identifying, using the determined densities for each line, portions of the documents likely associated with the at least one topic of interest; and
  providing data characterizing the identified portions of the document.

17. A computer-readable medium as in claim 16, wherein the operations further comprise: applying a density smoothing filter to each line to result in smoothed densities, and wherein the portions of the documents likely associated with the at least one topic of interest are identified using the smoothed densities.

18. A computer-readable medium as in claim 16, wherein the portions of the documents likely associated with the at least one topic of interest are identified by: for every line in file, if a pre-defined density related condition is met, (i) growing an existing text island if an immediately prior line is part of the existing text island, or (ii) creating a new text island if the immediately prior line is not part of an existing text island, and if a pre-defined density condition is not met, skipping the line.

19. A system comprising:
  at least one data processor;
  memory storing instructions, which when executed by the at least one data processor result in operations comprising:
    receiving a document having a plurality of lines with text, the document comprising text associated with at least one topic of interest and text not associated with the at least one topic of interest;
    determining, for each line in the document, a length of the line and a number of off-topic indicators, the off-topic indicators includes a number of hyperlinks in the line, the off-topic indicators characterizing portions of the document as likely being not being associated with the at least one topic of interest;
    determining a density for each line based on the determined line length and the determined number of off-topic indicators, the density for each line being proportional to the determined line length and inversely proportional to an exponential base greater than one of the number of off-topic indicators;
    identifying, using the determined densities for each line, portions of the documents likely associated with the at least one topic of interest; and
    providing data characterizing the identified portions of the document;
    wherein the portions of the documents likely associated with the at least one topic of interest are identified by: for every line in file, if a pre-defined density related condition is met, (i) growing an existing text island if an immediately prior line is part of the existing text island, and (ii) creating a new text island if the immediately prior line is not part of an existing text island, and if a pre-defined density condition is not met, skipping the line.

* * * * *